US008770732B2

(12) United States Patent
Jones et al.

(10) Patent No.: US 8,770,732 B2
(45) Date of Patent: Jul. 8, 2014

(54) INDUCTIVE HEATER FOR A SOLID INK RESERVOIR

(75) Inventors: Brent Rodney Jones, Sherwood, OR (US); Edward Francis Burress, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 616 days.

(21) Appl. No.: 12/963,623

(22) Filed: Dec. 8, 2010

(65) Prior Publication Data

US 2012/0147105 A1 Jun. 14, 2012

(51) Int. Cl.
*B41J 2/175* (2006.01)
*G01D 11/00* (2006.01)

(52) U.S. Cl.
USPC .................................. 347/88; 347/86; 347/99

(58) Field of Classification Search
CPC ...... B41J 2/48; B41J 2/16564; B41J 2/17593; B41J 2/1755; B41J 2/0057; B41J 2/01; B41J 2/17559; C09D 11/30
USPC ...................................................... 347/88, 99
See application file for complete search history.

(56) References Cited

U.S. PATENT DOCUMENTS

| | | | | |
|---|---|---|---|---|
| 5,283,409 | A | 2/1994 | Brendel et al. | |
| 5,568,235 | A | 10/1996 | Amarakoon | |
| 5,598,200 | A * | 1/1997 | Gore | 347/88 |
| 5,621,444 | A * | 4/1997 | Beeson | 347/88 |
| 6,523,944 | B1 * | 2/2003 | Roy et al. | 347/85 |
| 6,725,010 | B1 | 4/2004 | Parker | |
| 6,905,201 | B2 * | 6/2005 | Leighton | 347/88 |
| 7,257,360 | B2 | 8/2007 | Domoto et al. | |
| 8,313,183 | B2 * | 11/2012 | Platt et al. | 347/88 |

* cited by examiner

*Primary Examiner* — Stephen Meier
*Assistant Examiner* — Renee I Wilson
(74) *Attorney, Agent, or Firm* — Maginot, Moore & Beck, LLP

(57) ABSTRACT

A container for storing phase-change ink includes a housing that is comprised primarily of a thermally insulating material and an inductive heater element positioned within the housing. The inductive heater element is formed in a manner that increases the surface area of the heater and enables frozen ink in the vicinity of a reservoir outlet to melt quickly to enable printing operations.

20 Claims, 6 Drawing Sheets

INDUCTIVE HEATER FOR A SOLID INK RESERVOIR

TECHNICAL FIELD

The apparatus and method described below relates to devices for heating phase change ink, and more particularly to using immersed heaters in an ink reservoir to melt solidified ink.

BACKGROUND

Inkjet printers eject drops of liquid ink from inkjet ejectors to form an image on an image receiving surface, such as an intermediate transfer surface, or a media substrate, such as paper. Full color inkjet printers use a plurality of ink reservoirs to store a number of differently colored inks for printing. A commonly known full color printer has four ink reservoirs. Each reservoir stores a different color ink, namely, cyan, magenta, yellow, and black ink, for the generation of full color images.

Phase change inkjet printers utilize ink that remains in a solid phase at room temperature. After the ink is loaded into a printer, the solid ink is transported to a melting device, which melts the solid ink to produce liquid ink. The liquid ink is stored in a reservoir that may be either internal or external to a printhead. The liquid ink is provided to the inkjet ejectors of the printhead as needed. If electrical power is removed from the printer to conserve energy or for printer maintenance, the melted ink begins to cool and may eventually return to the solid form. In this event, the solid ink needs to be melted again before the ink can be ejected by a printhead. Consequently, the time taken to melt the ink impacts the availability of a solid ink printer for printing operations. Therefore, improvements to the devices in a printer that heat and store melted ink are desirable.

SUMMARY

A container for melting solid ink in a solid inkjet printer has been developed. The container comprises a housing comprised of thermally insulating material. The housing has a volume of space internal to the housing with a height, a width, and a depth. The container includes an inductive heater element positioned within the volume of space of the housing to melt ink within the volume of space. The heater element is configured to have a surface area that is greater than an area defined by the height and width of the volume of space.

In another embodiment, a printer comprises an ink loader configured to receive solid ink, and a melting device positioned to receive solid ink from the ink loader. The melting device is configured to heat the solid ink to a temperature for melting the solid ink and producing liquid. A container is fluidly connected to the melting device to receive melted solid ink from the melting device. The container includes a housing comprised of thermally insulating material. The housing has a volume of space internal to the housing having a height, a width, and a depth. An inductive heater element is positioned within the volume of space of the housing to melt ink within the volume of space. The heater element has a surface area that is greater than an area defined by the height and width of the volume of space.

DETAILED DESCRIPTION

Figure 1:
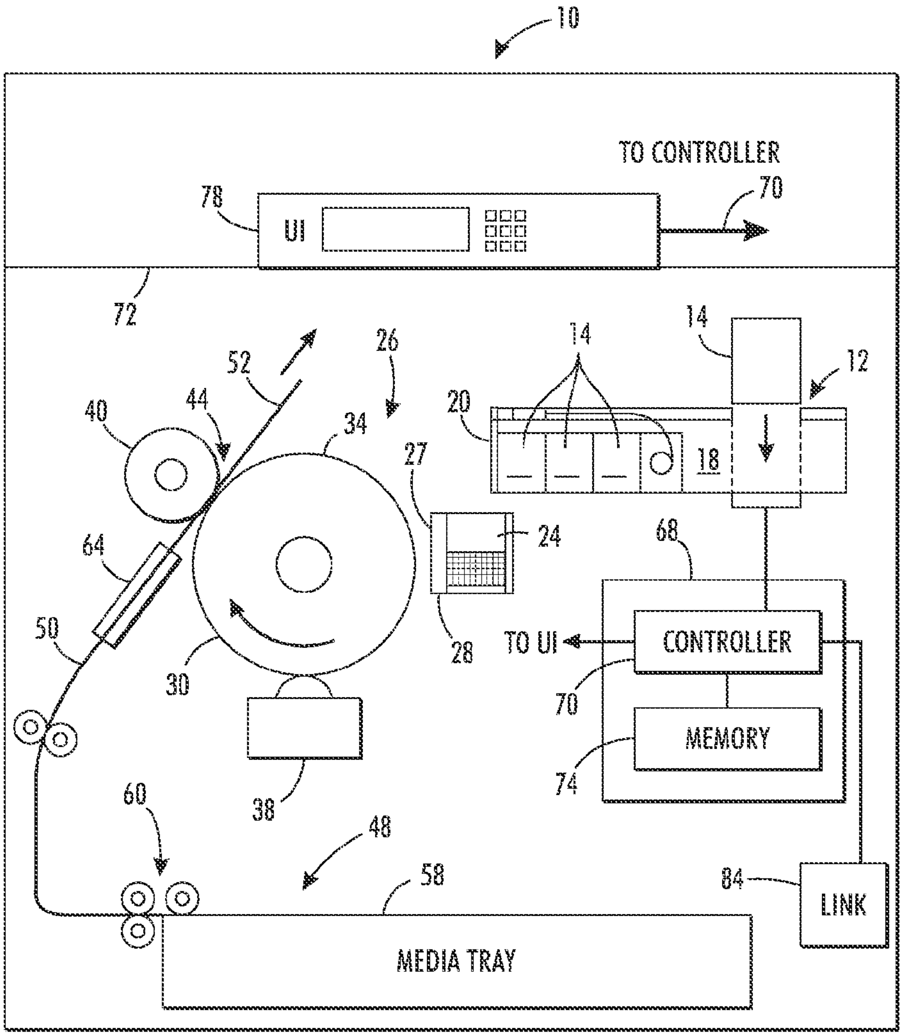
FIG. 1 is a schematic view of an indirect phase change inkjet printing system.

The description below and the accompanying figures provide a general understanding of the environment for the system and method disclosed herein as well as the details for the system and method. In the drawings, like reference numerals are used throughout to designate like elements. The word "printer" as used herein encompasses any apparatus that generates an image on media with ink. The word "printer" includes, but is not limited to, a digital copier, a bookmaking machine, a facsimile machine, a multi-function machine, or the like. While the specification focuses on a system that controls the melting of solid ink in a solid ink reservoir, the apparatus for melting ink in a reservoir may be used with any device that uses a phase-change fluid that has a solid phase. Furthermore, solid ink may be called or referenced as ink, ink sticks, or sticks. The term "parametric volume" refers to a volume defined by an envelope around the form of an object, such as a heater element, that may include gaps and cavities. Thus, the parametric volume of an object includes open spaces within the object as well as the volume of material forming the object. Parametric volume as used in this document means an interior volume of a tight fitting, multi-sided box into which the heater fits.

FIG. 1 is a side schematic view of an embodiment of a phase change ink printer configured for indirect or offset printing using melted phase change ink. The printer 10 of FIG. 1 includes an ink handling system 12, a printing system 26, a media supply and handling system 48, and a control system 68. The ink handling system 12 receives and delivers solid ink to a melting device for generation of liquid ink. The printing system 26 receives the melted ink and ejects liquid ink onto an image receiving surface under the control of system 68. The media supply and handling system 48 extracts media from one or more supplies in the printer 10, synchronizes delivery of the media to a transfix nip for the transfer of an ink image from the image receiving surface to the media, and then delivers the printed media to an output area.

In more detail, the ink handling system 12, which is also referred to as an ink loader, is configured to receive phase change ink in solid form, such as blocks of ink 14, which are commonly called ink sticks. The ink loader 12 includes feed channels 18 into which ink sticks 14 are inserted. Although a single feed channel 18 is visible in FIG. 1, the ink loader 12 includes a separate feed channel for each color or shade of color of ink stick 14 used in the printer 10. The feed channel 18 guides ink sticks 14 toward a melting assembly 20 at one end of the channel 18 where the sticks are heated to a phase change ink melting temperature to melt the solid ink to form liquid ink. Any suitable melting temperature may be used depending on the phase change ink formulation. In one embodiment, the phase change ink melting temperature is approximately 80° C. to 130° C.

The melted ink from the melting assembly 20 is directed gravitationally or by other means to a container for storage. The container includes a housing having a volume of space internal to the housing in which the ink is stored. The container is sometimes called a melted ink reservoir, an ink reservoir, or a melt reservoir. A separate reservoir 24 may be provided for each ink color, shade, or composition used in the printer 10. Alternatively, a single reservoir housing may be compartmentalized to contain the differently colored inks. As depicted in FIG. 1, the ink reservoir 24 feeds melted ink to passages in the printhead 28 that lead to inkjet ejectors formed in the front face 27 of the printhead. The ink reservoir 24 is integrated into or intimately associated with the printhead 28. In alternative embodiments, the reservoir 24 may be a separate or independent unit from the printhead 28. Each melt reservoir 24 may include a heating element, as shown in further detail below, operable to heat the ink contained in the corresponding reservoir to a temperature suitable for melting the ink and/or maintaining the ink in liquid or molten form, at least during appropriate operational states of the printer 10. In the embodiment of FIG. 1, the ink reservoir 24 is positioned to receive melted ink directly from the melting assembly 20. In alternative embodiments, reservoir 24 may receive melted ink from another source of melted ink, such as an intermediate reservoir (not shown) that receives melted ink from the melting assembly 20.

The printing system 26 includes at least one printhead 28 having inkjets arranged to eject drops of melted ink. One printhead is shown in FIG. 1 although any suitable number of printheads 28 may be used. The printheads are operated in accordance with firing signals generated by the control system 68 to eject drops of ink toward an ink receiving surface. As depicted, the printer 10 of FIG. 1 is configured to use an indirect printing process in which the drops of ink are ejected onto an intermediate surface 30 and then transferred to print media. In alternative embodiments, the printer 10 may be configured to eject the drops of ink directly onto recording media.

The intermediate surface 30 includes a layer or film of release agent applied to rotating member 34 by the release agent application assembly 38, which is also known as a drum maintenance unit (DMU). The rotating member 34 is shown as a drum in FIG. 1 although in alternative embodiments the rotating member 34 may comprise a moving or rotating belt, band, roller or other similar type of structure. A transfix roller 40 is loaded against the intermediate surface 30 on rotating member 34 to form a nip 44 through which sheets of print media 52 pass. The sheets are fed through the nip 44 in timed registration with an ink image formed on the intermediate surface 30 by the inkjets of the printhead 28. Pressure (and in some cases heat) is generated in the nip 44 to facilitate the transfer of the ink drops from the surface 30 to the print media 52 while substantially preventing the ink from adhering to the rotating member 34.

The media supply and handling system 48 of printer 10 is configured to transport print media along a media path 50 defined in the printer 10 that guides media through the nip 44, where the ink is transferred from the intermediate surface 30 to the print media 52. The media supply and handling system 48 includes at least one media source 58, such as supply tray 58 for storing and supplying print media of different types and sizes for the device 10. The media supply and handling system includes suitable mechanisms, such as rollers 60, which may be driven or idle rollers, as well as baffles, deflectors, and the like, for transporting media along the media path 50.

The media path 50 may include one or more media conditioning devices for controlling and regulating the temperature of the print media so that the media arrives at the nip 44 at a suitable temperature to receive the ink from the intermediate surface 30. For example, in the embodiment of FIG. 1, a preheating assembly 64 is provided along the media path 50 for bringing the print media to an initial predetermined temperature prior to reaching the nip 44. The preheating assembly 64 may rely on radiant, conductive, or convective heat or any combination of these heat forms to bring the media to a target preheat temperature, which in one practical embodiment, is in a range of about 30° C. to about 70° C. In alternative embodiments, other thermal conditioning devices may be used along the media path before, during, and after ink has been deposited onto the media for controlling media (and ink) temperatures.

A control system 68 aids in operation and control of the various subsystems, components, and functions of the printer 10. The control system 68 is operatively connected to one or more image sources 72, such as a scanner system or a work station connection, to receive and manage image data from the sources and to generate control signals that are delivered to the components and subsystems of the printer. Some of the control signals are based on the image data, such as the firing signals, and these firing signals operate the printheads as noted above. Other control signals cause the components and subsystems of the printer to perform various procedures and operations for preparing the intermediate surface 30, delivering media to the transfix nip, and transferring ink images onto the media output by the imaging device 10.

The control system 68 includes a controller 70, electronic storage or memory 74, and a user interface (UI) 78. The controller 70 comprises a processing device, such as a central processing unit (CPU), an application specific integrated circuit (ASIC), a field programmable gate array (FPGA) device, or a microcontroller. Among other tasks, the processing device processes images provided by the image sources 72. The one or more processing devices comprising the controller 70 are configured with programmed instructions that are stored in the memory 74. The controller 70 executes these instructions to operate the components and subsystems of the printer. Any suitable type of memory or electronic storage may be used. For example, the memory 74 may be a non-volatile memory, such as read only memory (ROM), or a programmable non-volatile memory, such as EEPROM or flash memory.

User interface (UI) 78 comprises a suitable input/output device located on the imaging device 10 that enables operator interaction with the control system 68. For example, UI 78 may include a keypad and display (not shown). The controller 70 is operatively coupled to the user interface 78 to receive signals indicative of selections and other information input to the user interface 78 by a user or operator of the device. Controller 70 is operatively coupled to the user interface 78 to display information to a user or operator including selectable options, machine status, consumable status, and the like. The controller 70 may also be coupled to a communication link 84, such as a computer network, for receiving image data and user interaction data from remote locations.

The controller 70 generates control signals that are output to various systems and components of the printer 10, such as the ink handling system 12, printing system 26, media handing system 48, release agent application assembly 38, media path 50, and other devices and mechanisms of the printer 10 that are operatively connected to the controller 70. Controller 70 generates the control signals in accordance with programmed instructions and data stored in memory 74. The control signals, for example, control the operating speeds, power levels, timing, actuation, and other parameters, of the system components to cause the printer 10 to operate in various states, modes, or levels of operation, that are denoted in this document collectively as operating modes. These operating modes include, for example, a startup or warm up mode, various print modes, operational ready modes, maintenance modes, and power saving modes, such as standby or sleep.

When the printer is operating in a print mode or operational ready mode, the ink in the reservoirs is maintained in a liquid state by a heater associated with the reservoir. The heater is configured to output heat capable of maintaining the ink temperature within a predetermined range above the melting temperature for the ink. During some operating modes and device states, such as when the printer is shutdown, in a standby mode, or a power saving mode, the temperature of the ink is allowed to fall below the melting temperature by reducing the heat output by the heater or deactivating the heating system altogether. As a result, the ink is allowed to freeze, or solidify, to varying degrees within the reservoirs. When the printer 10 is returned to a print mode or an operational ready mode, the reservoir heater is activated to generate heat at a level capable of melting the solidified ink in the reservoirs and bring the temperature of the ink to a suitable temperature for printing.

One concern faced in transitioning a phase change ink printing device from a shutdown state, standby mode, or power saving mode to a print mode or ready mode is the amount of time required for the ink in the reservoirs to melt sufficiently to begin printing. Reservoir heaters have typically utilized heating elements located external to the ink in the reservoir. These heaters transfer thermal energy into the reservoir housing until the housing reaches a temperature that first melts the ink that is exposed to or in thermal contact with the reservoir housing. The thermal energy then migrates inwardly through the ink within the internal volume of the housing. Thus, the time required to bring a given volume of ink to a fully molten state depends at least in part on the amount of surface area of the ink available for exposure to thermal energy and the distance that the thermal energy must be conducted to fully permeate the mass. The surface area available for exposure to or contact with a heat source external to the ink, however, is limited by the geometry of the reservoir. To reduce the time required to bring ink to a fully molten state for printing, the ink may be heated at temperatures higher than would otherwise be required. The higher thermal output, however, increases the energy expenditure of the printer.

As an alternative to previously known reservoir heaters, the reservoirs of a phase change ink printer may be equipped with an inductive heating system. As discussed below, the inductive heating system includes a heating element configured to be immersed in the ink in a reservoir and to be inductively heated from a source external to the reservoir. Thus, thermal energy is generated within the volume of ink in the reservoir to avoid the need to heat the housing. In addition, the inductive heating element has a configuration or shape that enables a very high surface area to volume ratio in order to increase the heater surface area available for thermal contact with the ink. As a result, melting or elevating the temperature of a substantial portion of the volume of ink in a reservoir occurs much more rapidly than can occur with a heater that heats all or a portion of the ink reservoir. In addition, the heating element may be arranged proximate the outlet of the reservoir in order to melt ink in and around the outlet so that an initial melt volume is readily usable prior to establishing a fully molten state of the ink volume within the reservoir.

Figure 2:
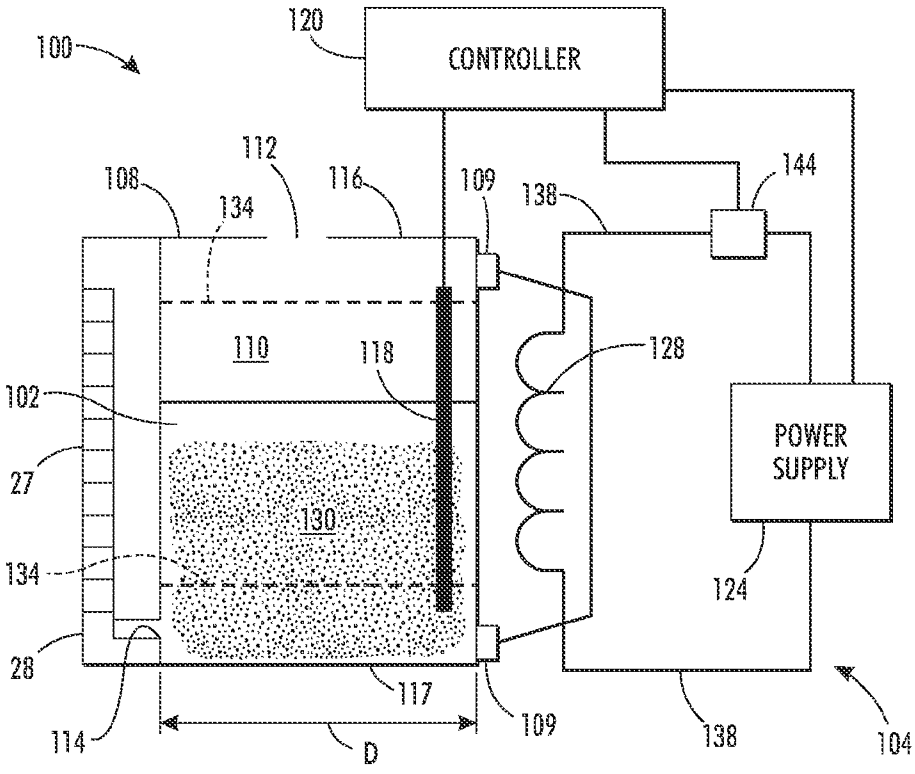
FIG. 2 is a schematic side elevational view of an ink reservoir including an inductive heating system with a heating element positioned in the reservoir.

Referring now to FIG. 2, a melt reservoir assembly 100 having an inductive ink heating system 104 in accordance with the present disclosure is shown in greater detail. As depicted, the reservoir includes a housing 108 that defines an interior container, referred to herein as reservoir volume 110, for receiving and holding quantities of melted ink. The housing 108 is formed of a non-electrically conductive material capable of permitting the passage of magnetic fields through the housing without substantial interference and that is compatible with various phase change inks in both the solid and molten phases. Various plastics, including thermosetting plastics and elastomeric materials, may be used in the housing 108. Additionally, the housing 108 may comprise one or more layers of both thermally insulating and thermally conductive materials. The materials of housing 108 are configured to provide at least moderate heat retention within reservoir volume 110.

The housing 108 includes at least one inlet opening 112 and at least one outlet opening or conduit 114. Melted ink is introduced into the volume 110 through the inlet 112 from a source of melted ink, such as the melting assembly 20, a conduit, or from another reservoir. The inlet 112 is located in an upper portion of the housing 108 near or in the top surface or wall 116. In the embodiment of FIG. 2, the inlet 112 may be implemented as a full or partial opening in the top portion 116 above the reservoir volume 110. Melted ink is delivered from the volume 110 via the outlet opening or conduit 114. The reservoir 100 may be integrated into or closely associated with a printhead 28 or may be a separate or independent unit from the printhead. In the embodiment of FIG. 2, the reservoir 100 comprises a printhead reservoir configured to feed melted ink to a plurality of inkjet ejectors 27 in the printhead 28. Alternatively, the outlet 114 may connect the reservoir volume 110 to another conduit, tube, or other flow path structure (not shown) for transporting melted ink to a remote printhead or another reservoir.

Figure 3:
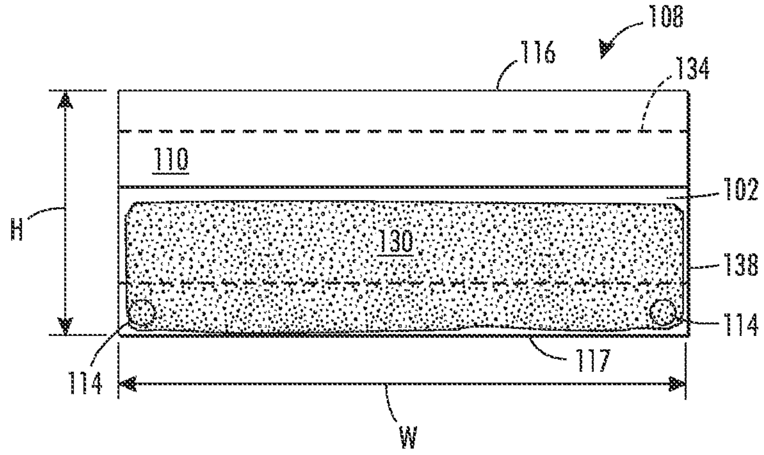
FIG. 3 is a schematic rear elevational view the ink reservoir of FIG. 2 shown without the heating system for clarity.

Referring to FIGS. 2 and 3, the reservoir volume 110 of the housing 108 has dimensions that define a volume of space for containing ink. The dimensions that define the reservoir volume of space depend on the shape utilized. For example, in the embodiment of FIGS. 2 and 3, the reservoir volume 110 has a generally cubic or cuboid shape defined by a height H, width W, and depth D. In alternative embodiments, the reservoir volume 110 may have other suitable shapes, such as cylindrical, regular and irregular shapes, combinations of shapes, as examples. The terms height, width, and depth used in relation to a reservoir volume may be broadly construed to encompass the dimensional attributes used to define volume in regard to such shapes. Further defined within the reservoir volume 110 are an upper liquid ink volume level limit (as shown by dashed line 134) and a lower liquid ink volume level limit (shown as dashed line 138). As used herein, the upper limit 134 and the lower limit 138 represent a desired maximum and minimum volume of ink, respectively, to maintain within the reservoir volume 110 during normal operations of the device 10. As depicted in FIG. 2, an ink level sensor 118 may be positioned at least partially in the reservoir volume 110 for detecting when the height or level of ink in the reservoir volume 110 reaches one or both of the upper and lower volume limits 134, 138. Any suitable type of ink level sensor 118 may be utilized. The ink level sensor 118 is coupled to a controller 120 and is configured to output signals indicative of the detected ink level to the controller 120. Controller 120 is configured to control the supply of melted ink to the reservoir volume 110 via the inlet 112 based at least in part on the ink level in the reservoir volume 110.

As depicted in FIG. 2, the upper volume limit 134 may be set below the upper surface 116 of the reservoir volume 110 to provide tolerance for angled placement and/or tipping of the printer 10. The lower volume limit 138 is set above the bottom 117 of the reservoir volume 110 and above the outlet 114. If the ink height in the reservoir volume 110 reaches or falls below the low volume limit 138, the controller 120 may suspend operation or take other actions to ensure that the fluid level in reservoir volume 208 exceeds the low limit fluid level. The controller 120 comprises a processing device, such as those described above. Controller 120 may be incorporated into the control system 68 of the printer 10 or may comprise a separate dedicated control system for the reservoir assembly 100.

The inductive heating system 104 comprises an induction power supply 124, an induction coil 128, and an inductive heater element 130. The induction coil 128 is positioned exterior to the housing 108. The reservoir housing may be any material compatible with inductive heating of the heater element. The use of a plastic material for the housing 108 enables the incorporation of retaining and/or locating features 109 on the exterior of the housing to facilitate placement of the coil relative to the reservoir volume 110 and the heating element 130, which may also be positioned or affixed to the interior of the housing by use of incorporated location features. Electric leads 138 couple the induction coil 128 to the power supply 124. In operation, power supply 124 generates an alternating current that passes through the coil 128. The alternating current causes the coil 128 to produce an alternating magnetic field that impinges on the inductive heater element 130 in the reservoir chamber 110. As is known in the art, the alternating magnetic field induces heat in the inductive heater element 130 through eddy current losses and/or hysteresis. The controller 120 is coupled to the induction power supply 124 in order to activate the power supply 124 to generate the alternating current at one or more predetermined power levels and/or frequencies calculated to control the amount of heat generated in the heater element 130. By controlling the power level and frequency of the power supply 124 as well as other parameters, such as the coil 128 dimensions and positioning with respect to the heater element 130, a targeted level of heat may be rapidly generated in the heater element 130.

The heating element 130 is formed at least partially of a thermally conductive material capable of generating and maintaining heat levels suitable for melting ink in the reservoir in response to the magnetic fields from the coil 128. In one embodiment, the heating element is formed at least partially of a metal material, such as stainless steel, although any suitable thermally conductive material may be used. The heating element may have ferromagnetic properties that facilitate hysteresis heating of the heating element 130 in response to the alternating magnetic field.

Figure 4:
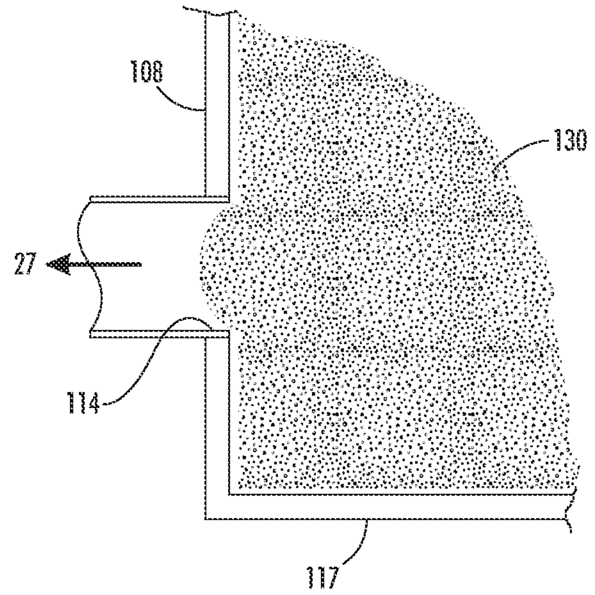
FIG. 4 is an enlarged view of a portion of the reservoir of FIG. 2 showing the outlet of the reservoir and a portion of the heating element of the heating system.

The heating element is arranged in the reservoir volume 110 proximate the bottom 117 of the reservoir volume 110 and extending toward the top 116. In one embodiment, the parametric volume of the heater element 130 is greater than 50% of the total volume of the reservoir volume 110 up to the upper volume limit 134. As depicted in FIG. 2, at least a portion of the heater element 130 is arranged below the lower volume limit 138 of the reservoir volume 110 to enable at least a portion of the heater element to be immersed in ink during most operating modes and device states. As best seen in FIG. 4, the heater element 130 may occupy a position in reservoir volume 110 that is proximate outlet 114 to expedite melting of ink near the outlet 114. Depending on the configuration of the heater element 130, the heater element 130 may extend all the way to the threshold of the outlet 114 and in some cases partially into the outlet 114.

The heating element 130 has a configuration or shape with a very high surface area in relation to the parametric volume of the heating element 130. In one embodiment, the heater element 130 has a shape that provides a surface area available for exposure to ink 102 that is greater than a surface area defined by the height H and width W of reservoir volume 110. A number of different shapes and configurations may be used for the heating element 130. For example, the heating element 130 may comprise a web, bundle, mesh, screen, braid, weave, or cluster of conductive fibers, strands, or filaments. Such a grouping of thin conductive material offers a readily attainable, very high surface area to volume ratio while providing sufficient space between the fibers and/or filaments to allow ink to flow through the outlet 114. The heating element 130 of FIGS. 2-4 is representative of a fibrous or filament-like bundle or cluster, similar to steel wool.

Figure 5:
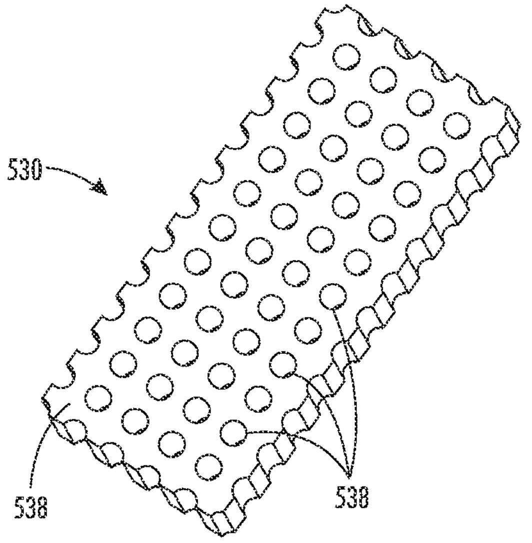
FIG. 5 is a perspective view of an embodiment of a heating element for use with the heating system of FIG. 2 that comprises a block of material with a plurality of channels.
Figure 6:
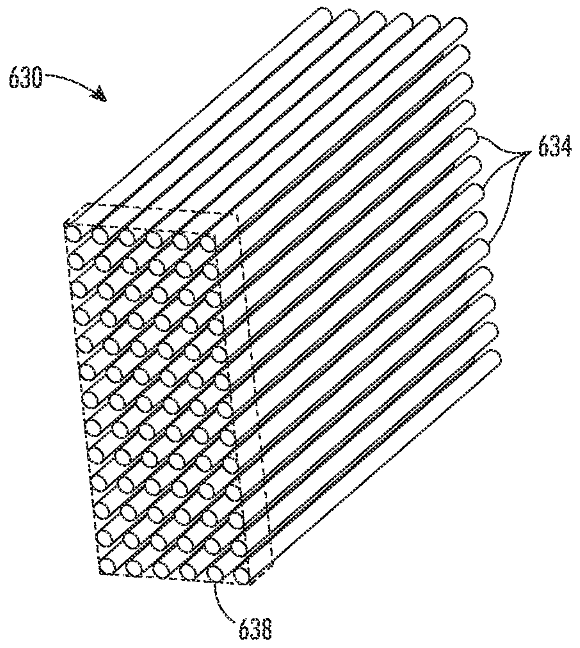
FIG. 6 is a perspective view of another embodiment of a heating element for use with the heating system of FIG. 2 that comprises a plurality of elongated rods configured to extend across the width of the reservoir.
Figure 7:
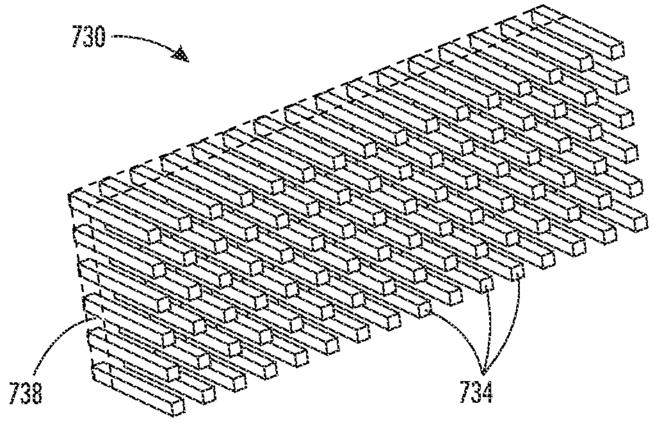
FIG. 7 is a perspective view of another embodiment of a heating element for use with the heating system of FIG. 2 that comprises a plurality of elongated rods configured to extend across the depth of the reservoir.
Figure 8:
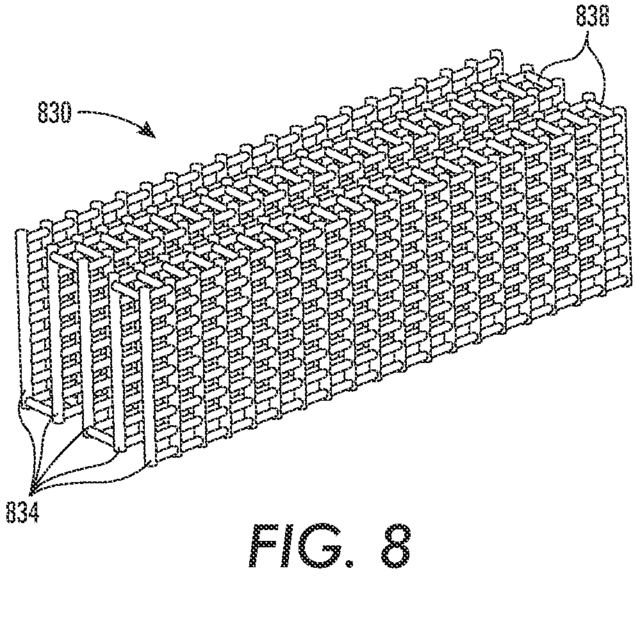
FIG. 8 is a perspective view of another embodiment of a heating element for use with the heating system of FIG. 2 that comprises a plurality of web or grid-like sheets.

FIGS. 5-8 depict some of the other possible configurations of heating element 130 that may be used. For example, FIG. 5 depicts a heating element 530 that comprises a block 534 of conductive material having a plurality of channels 538 that extend through the block of material. The channels 538 are evenly distributed in the block 534 so heat is generated substantially uniformly across the length and width of the block 534. FIG. 6 depicts a heating element 630 that comprises a plurality of elongated rods 634. The rods 634 are configured to extend lengthwise across the width W of the reservoir volume 110. Similar to the channels 538 of FIG. 5, the rods are evenly spaced apart so that heat is generated substantially uniformly across the length and width of the heater element 630. An end cap 638 (shown in phantom in FIG. 6), or a similar type of structure, may be used at one or both ends of the heating element 630 to structurally connect the rods 634. FIG. 7 depicts a heating element 730 that comprises a plurality of elongated rods 734. An end cap 738 (shown in phantom in FIG. 7) may be used to thermally connect the rods 734. The heating element 730 is substantially the same as the heating element 630 except the elongated rods 734 of the heating element 730 are configured to extend along the depth D in the reservoir volume 110. FIG. 8 depicts a heating element 830 that comprises a plurality of webs, screens, meshes, or grid-like sheets 834 of conductive material arranged in layers and uniformly spaced apart from each other. Rods 838 extend between consecutive webs 834 to structurally couple the webs 834.

The controller 120 of the heating system 104 is operable to control the power level and/or frequency of the power supply 124 to enable the ink to be heated to temperatures appropriate for the mode of operation of the printer 10. For example, when the printer 10 is operated in a print mode or ready mode and the melting assembly 20 is activated to melt solid phase change ink to a melting temperature, melted ink flows into the reservoir volume 110 via the inlet 112. The controller 120 activates the power supply 124 at a level configured to maintain the ink received in the reservoir volume 110 in a liquid state. The melted ink may flow through the outlet 114 to the inkjet ejectors in the printhead 28. When transitioning from a print mode or ready mode to a standby mode or a power saving mode, the controller 120 may deactivate the power supply 124 or reduce the power level and/or frequency of the power supply 124 depending on the mode. As a result, the ink temperature may drop to or below the freezing point for the ink and the ink may solidify within the reservoir volume 110.

When the device transitions from a standby mode or power saving mode to a print mode or ready mode, the controller 120 activates the power source 124 to inductively heat the heating element 130. As heat is generated in the heating element 130, the solid ink 102 in areas proximate to the heater element 130 begin to melt first. The location of heater element 130 at a position proximate to outlet 114 enables ink melting to occur proximate the outlet 114 and melted ink to flow through the outlet 114 quickly after the heater 130 begins to heat. Thus, melted ink may flow through outlet 114 to printhead 28 even if other portions of the ink 102 in the reservoir volume 110 have not reached a fully molten state.

Figure 9:
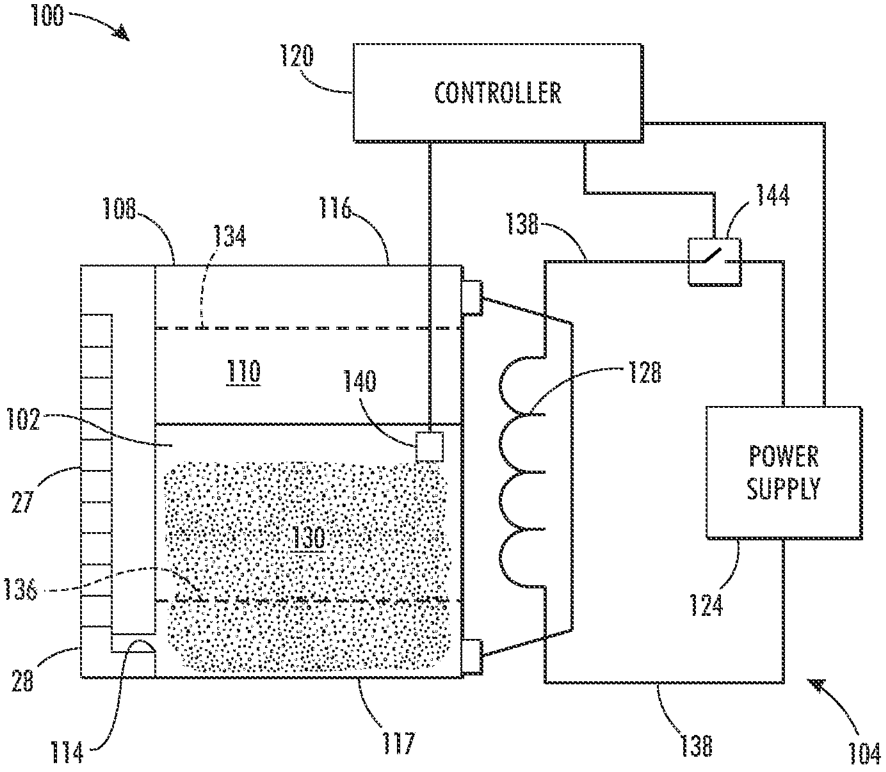
FIG. 9 is a schematic view of an ink reservoir including an inductive heating system with a heating element positioned in the reservoir and a controller embodied as a thermostat.

Referring now to FIG. 9, in one embodiment, controller 102 may be configured with a temperature sensor 140 to enable temperature regulation of the ink in the reservoir volume 110. In this embodiment, controller 102 receives temperature information from a temperature sensor 140 and selectively opens and closes switch 144 to control a flow of electrical current from power supply 124 to the induction coil 128 via electrical leads 138. Switch 144 may be an electromechanical or solid state switch. In this embodiment, controller 120 selectively opens and closes switch 144 in response to the reservoir temperature detected by temperature sensor 140. When the signal generated by the temperature sensor 140 indicates that the ink temperature is below a predetermined lower temperature threshold, controller 120 closes switch 144 to enable electric current from power supply 124 to flow to the coil 128 causing the coil 128 to generate an alternating magnetic field. The temperature of heater element 130 increases in response to alternating magnetic field, heating ink in the ink reservoir 110. When the temperature of ink 102 reaches an upper threshold temperature that is higher than the lower threshold temperature, controller 120 opens switch 144 to remove electric current from the coil 124 to reduce heat in the heater element 130. Alternatively, a more precise control method may use a temperature change rate or predetermined temperatures approaching offsets from the lower or upper temperature set points to initiate a change in the current delivered to the heater and/or on/off cycling frequency. One form of this type of "switch" is a PID controller. Lower and upper temperature thresholds for some embodiments of phase change ink that may be used are 110° C. and 125° C., respectively.

In another mode of operation, ink 102 occupies reservoir volume 110 in a solid phase. Controller 120 may open switch 144 to allow the ink 102 to cool and solidify according to various energy saving programs and techniques that are known to the art. Ink 102 may also solidify when a printing device is disconnected from electrical power for a time period sufficient to allow the ink to cool to the freezing point. When melting solidified ink, controller 120 closes switch 144 to enable electrical current from power source 124 to flow through leads 138 to the coil 128, causing the coil 128 to generate an alternating magnetic field that induces heat in the heater element 130. Heater element 130 applies heat uniformly across width W of reservoir volume 110. Due to the proximity of heater element 130 to inkjet ejectors 27 in the printhead 28, ink 102 near the ejectors 27 melts more quickly than ink in portions of the reservoir volume 110 that are farther from the inkjet ejectors 27. Thus, the ejectors 27 receive melted ink in a uniform manner across the width of the printhead and melted ink is available for ejection through the plurality of ejectors even if a portion of the ink 102 remains solid.

The embodiments described above are merely illustrative and are not limiting of alternative embodiments. Various implementations of an inductive heater element are described. In all cases, various non-heater components are compatible with the different implementations. For example, housing material, venting, temperature feedback control, reservoir volume, and fluid level volume limits may be used with any of the inductive heater elements. Inductive heater elements may be orientated in any way relative to the reservoir. Configurations incorporating angled folds, bends, holes, voids and the like enlarge the surface area of the heater element and enable gravity to urge liquefied ink to reservoir outlets. While FIG. 1 depicts an indirect phase-change imaging device, the heater elements and reservoirs described above are equally suited for use in other embodiments of phase-change ink imaging devices including direct marking devices. Additionally, the features described are suitable for use with imaging devices using one or multiple ink reservoirs and for imaging devices using one or more colors of ink.

It will be appreciated that variations of the above-disclosed and other features and functions, or alternatives thereof, may be desirably combined into many other different systems, applications or methods. Various presently unforeseen or unanticipated alternatives, modifications, variations or improvements therein may be subsequently made by those skilled in the art which are also intended to be encompassed by the following claims.

What is claimed is:

1. A container for melting solid ink in a solid inkjet printer comprising:

a housing comprised of non-electrically conductive material, the housing having a volume of space internal to the housing, the volume of space having a height, a width, and a depth;

an inductive heater element positioned within the volume of space of the housing to melt ink within the volume of space, the heater element being configured to have a surface area that is greater than an area defined by the height and width of the volume of space;

a temperature sensor positioned within the volume of space to enable the temperature sensor to sense a temperature of ink stored in the volume of space within the housing, the temperature sensor being configured to enable a controller to be operatively connected to the temperature sensor for monitoring temperature within the housing;

at least one retainer located on the housing to enable an electrical coil to be positioned proximate the housing.

2. The container of claim 1 wherein at least a portion of the inductive heater element is positioned proximate an outlet in the housing.

3. The container of claim 2 wherein a portion of the inductive heater element extends to the outlet in the housing.

4. The container of claim 1 wherein the non-electrically conductive material is a thermoset plastic.

5. The container of claim 1 wherein a parametric volume of the inductive heater element is greater than 50% of a fluid volume completely filling the volume of space within the housing.

6. The container of claim 1, the inductive heater element further comprising:

a plurality of conductive elongated rods.

7. The container of claim 1, the inductive heater element further comprising:

a web of conductive material.

8. The container of claim 1, the inductive heater element further comprising:

a block of conductive material having a plurality of channels through the block of conductive material.

9. The container of claim 1, the inductive heater element further comprising:

a plurality of conductive fibers.

10. A printer comprising:

an ink loader configured to receive solid ink;

a melting device that is positioned to receive solid ink from the ink loader and is configured to heat the solid ink to a temperature for melting the solid ink and producing liquid; and a container fluidly connected to the melting device to receive melted solid ink from the melting device, the container comprising:

a housing comprised of thermally insulating material, the housing having a volume of space internal to the housing, the volume of space having a height, a width, and a depth;

an inductive heater element positioned within the volume of space of the housing to melt ink within the volume of space, the heater element being configured to have a surface area that is greater than an area defined by the height and width of the volume of space;

a temperature sensor positioned within the volume of space to enable the temperature sensor to sense a temperature of ink stored in the volume of space within the housing;

an electrical coil positioned in the printer proximate the container;

an electrical power supply;

a switch operatively connected to the electrical power supply and the electrical coil; and a controller operatively connected to the temperature sensor and the switch to enable the controller to receive an electrical signal generated by the temperature sensor that corresponds to the temperature of the ink stored in the volume of space within the housing and to generate an electrical signal that operates the switch, the controller being configured to compare the electrical signal received from the temperature sensor to a predetermined threshold and to generate the electrical signal that operates the switch in response to the controller identifying the signal received from the temperature sensor as being less than the predetermined threshold, the electrical signal that operates the switch enables the switch to connect the electrical power supply to the coil selectively to enable an electromagnetic field generated by the electrical coil to induce electrical current in the inductive heater element and generate heat in the volume of space in the container.

11. The printer of claim 10 wherein at least a portion of the inductive heater element in the container is positioned proximate an outlet in the housing.

12. The printer of claim 11 wherein a portion of the inductive heater element in the container extends to the outlet in the housing.

13. The printer of claim 10, the housing of the container further comprising:

a plurality of inkjet ejectors fluidly connected to the volume of space to receive melted ink from the volume of space for ejection from the printing apparatus.

14. The printer of claim 10 wherein the thermally insulating material of the housing of the container is a thermoset plastic.

15. The printer of claim 10 wherein a parametric volume of the inductive heater element is greater than 50% of a fluid volume completely filling the volume of space within the housing.

16. The printer of claim 10, the inductive heater element in the container further comprising:

a plurality of conductive elongated rods.

17. The printer of claim 10, the inductive heater element in the container further comprising:

a web of conductive material.

18. The printer of claim 10, the inductive heater element in the container further comprising:

a block of conductive material having a plurality of channels through the block of conductive material.

19. The printer of claim 10, the inductive heater element in the container further comprising:

a plurality of conductive fibers.

20. The container of claim 1, the housing further comprising:

a plurality of inkjet ejectors fluidly connected to the volume of space to receive melted ink from the volume of space for ejection from the solid inkjet printer.

* * * * *